United States Patent [19]

Clune

[11] 4,356,875
[45] Nov. 2, 1982

[54] PORTABLE MOTORIZED GOLF CART

[75] Inventor: Robert H. Clune, Minster, Ohio

[73] Assignee: Elmer F. Clune, Tonawanda, N.Y.

[21] Appl. No.: 146,665

[22] Filed: May 5, 1980

[51] Int. Cl.³ .............................................. B62D 51/04
[52] U.S. Cl. .................................... 180/13; 180/19 S;
280/DIG. 5
[58] Field of Search ................. 180/19 R, 19 H, 19 S,
180/13; 280/DIG. 5

[56] References Cited

U.S. PATENT DOCUMENTS

| 2,498,780 | 2/1950 | Winchester | 280/405 R |
|---|---|---|---|
| 2,698,758 | 1/1955 | Ronning | 280/420 UX |
| 2,698,759 | 1/1955 | Ronning | 280/420 X |
| 2,706,008 | 4/1955 | Voigt | 280/DIG. 5 |
| 3,094,185 | 6/1963 | Racoosin | 280/DIG. 5 X |
| 3,199,621 | 8/1965 | Seaman | 180/19 R X |
| 3,225,853 | 12/1965 | Norton et al. | 180/19 H |
| 3,815,699 | 6/1974 | Ganskopp et al. | 280/DIG. 5 X |
| 3,871,464 | 3/1975 | Eden | 280/DIG. 5 X |
| 3,941,198 | 3/1976 | Kappas | 180/19 H X |
| 3,948,332 | 4/1976 | Tyner | 180/19 R |
| 3,989,116 | 11/1976 | Hirand et al. | 280/DIG. 5 X |
| 4,105,084 | 8/1978 | Baak | 180/19 R X |
| 4,106,583 | 8/1978 | Nemeth | 180/19 H X |

FOREIGN PATENT DOCUMENTS 2037634 2/1972 Fed. Rep. of Germany ... 280/DIG. 5

Primary Examiner—Joseph Paul Brust

[57] ABSTRACT

A portable motorized golf bag cart having an elongated main frame to which is attached a steering handle at the upper end thereof, a foldable undercarriage attached intermediate the ends thereof having a pair of spaced wheels, a motorized assembly attached to the lower end of the frame having a motor, a wheel steerable by the handle and speed regulating structure responsive to rotation of the wheel and controls mounted on the handle.

1 Claim, 10 Drawing Figures

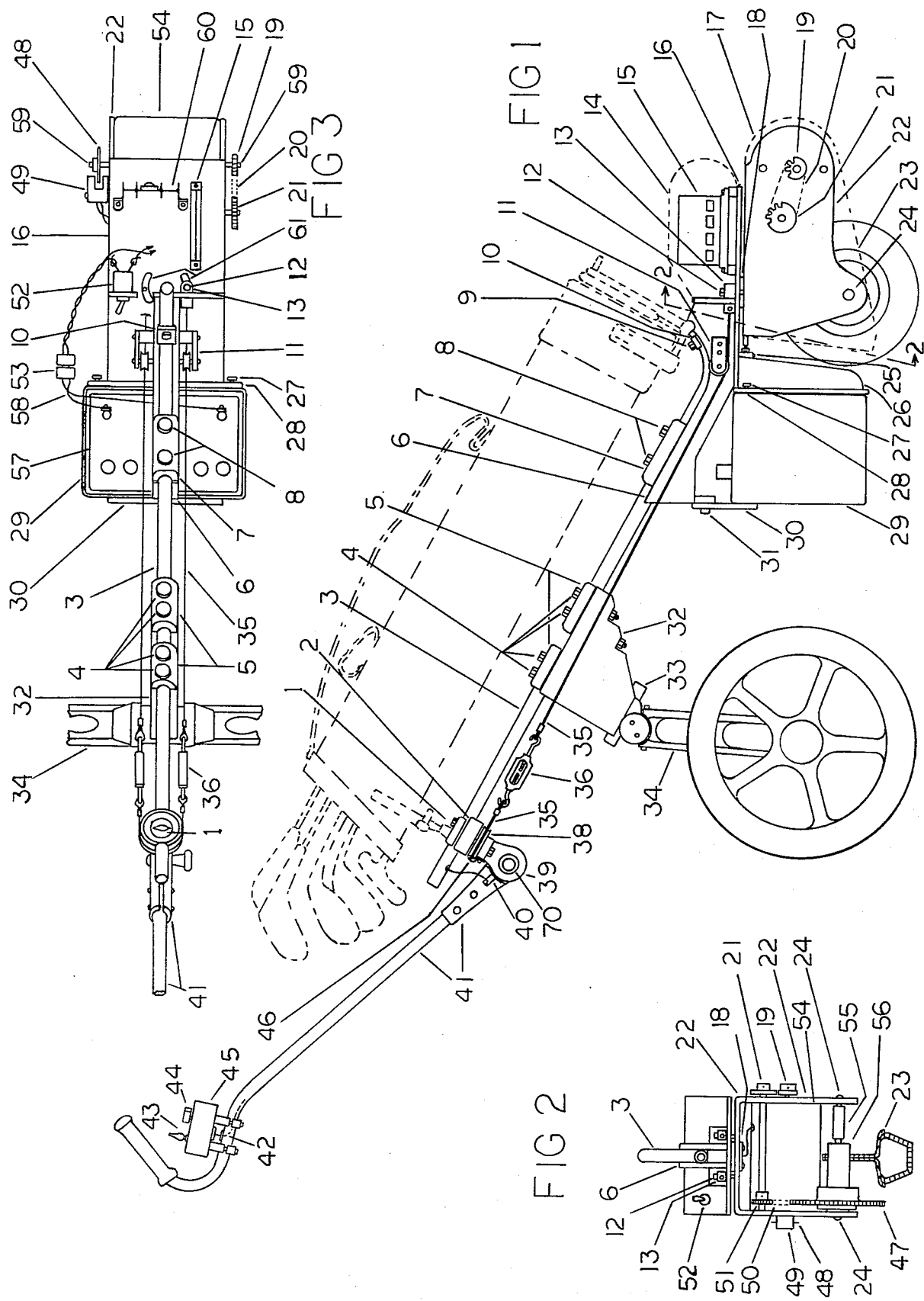

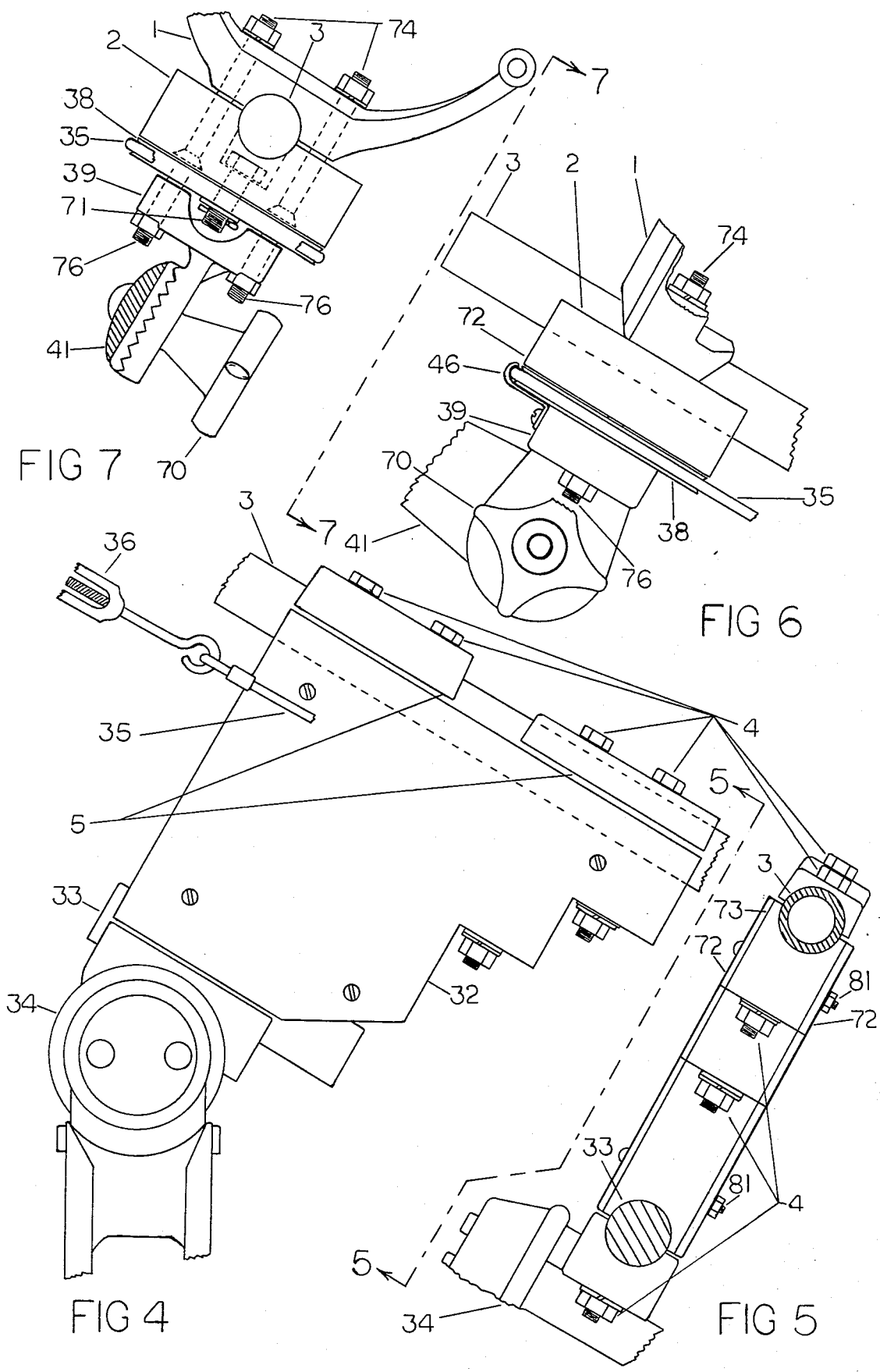

PORTABLE MOTORIZED GOLF CART

BACKGROUND OF THE INVENTION

The present invention relates to motorized carts and, more particularly, to a golf bag cart to which a motorized unit can be easily affixed as an add-on accessory or to which such a unit can be supplied as an original component thereof.

Many forms of motorized golf bag carts are known, the objectives of which relieve the player from the burden of manually propelling the golf bag carrier over hilly terrain. However, prior constructions fail in one way or another to combine all of the necessary elements or features to provide a device that will:

(a) be adequately resistant to tipping either front to rear or sideways with respect to line of travel;

(b) have proper weight distribution for good traction;

(c) have inherent straight ahead propulsion without constant operator contact and guidance;

(d) be easily steerable by the player following behind the cart; and (e) be of such a form that permits folding for each of handling in transport to and from the golf course.

To provide for straight ahead propulsion without constant operator guidance, requires that the cart be of a configuration placing on the terrain at all times a minimum of three wheels firmly directed straight ahead. Examples of carts providing this feature are shown in prior U.S. Pat. Nos. 3,094,185; 3,815,699; 3,871,464. Each of these three examples however lack one or more of the other listed features essential to providing ideal propulsion. Of the three patents cited, only No. 3,094,185 has a configuration that meets most of the above criteria except for the serious omission of a capability for steering. In the device of this patent a single, driven front wheel is well loaded to provide positive traction with excellent straight ahead propulsion without continuous operator contact.

Both U.S. Pat. Nos. 3,815,699 and 3,871,464 disclose configurations which use a rear wheel drive rather than the more ideal front wheel drive. U.S. Pat. No. 3,815,699 has a configuration, while permitting easy cart fold up tends to unweight or unbalance the front, fixedly-directed wheel entirely when moving on steeper inclines. This results in a tendency for the cart to stray from a straight line movement, unless the operator is in continuous contact and control. Furthermore this configuration has a tendency to easily tip front to rear. This configuration also does not provide true steerability in that the entire cart must be tipped to remove the front wheel from ground contact to permit steering.

The device of U.S. Pat. No. 3,871,464 has a lesser problem in providing straight ahead, unattended propulsion due to a relatively low front wheel load since the golf bag load is placed more centrally; however, this defeats the need to place most of the total weight on the traction-providing wheels. This configuration will, therefore, propel less well on steeper inclines, and is also not foldable for ease of transportation to and from the golf course.

SUMMARY OF THE INVENTION

The foregoing problems and difficulties of the prior art are overcome according to the teachings of the present invention which provides a fully portable, motorized cart, with a steerable front wheel drive that is properly loaded for adequate traction, while also providing a properly placed low center of gravity to eliminate any tendencies for tipping.

Including these essential features and others, the present invention, provides an original equipment bag cart, or alternatively, permits the easy conversion of a conventional two-wheeled golf bag cart into a three-wheeled powered cart. The cart according to the present invention may be steered with ease along either a straight course or around turns.

The powered cart of this invention functions to move along in front of the player with the steerable, drive unit wheel and drive motor mounted on that portion of the cart most forward of the player to optimally provide the desired straightline, unguided running characteristic.

In accordance with the present invention the golf cart, provided with power drive, remains essentially a single assembly retaining the typical collapsible-wheels feature, with only a rechargeable storage battery in an appropriate holder and which may be attached and removed in an easy manner, as a separate assembly.

Essentially the major components of the present invention provides a drive unit wheel assembly, comprising an attachment frame, a wheel and fork, a drive motor and a chain gear drive, a detachable battery, and speed control electronics.

For attachment to existing carts, a riser assembly is also employed to adjustably raise the frame of the existing cart above its wheeled undercarriage to increase the clearance necessary for mounting the power drive unit and to move the existing undercarriage closer to the operator to obtain an improved weight distribution, thereby enhancing stability in operation while placing sufficient weight on the driven front wheel for adequate traction.

Operator steering of the front wheel fork is accomplished by a tillerlike movement of the cart manipulating handle (which is similar to the conventional handle) but which is specially reattached to a steering pulley rotatably mounted on the upper end of the cart main frame which drives a steering cable wrapped around the pulley and passing down both sides of the cart main frame over guiding pulleys and attached to the fork on either side. The present invention also provides an electronic control chassis, with switches conveniently located on or attached to the existing cart handle to provide convenient operator control of the motorized cart.

BRIEF DESCRIPTION OF THE DRAWINGS

Other objects and special features of the present invention will become apparent as the description thereof proceeds with the aid of the accompanying drawing wherein:

FIG. 1 is a side view of the fully assembled cart according to the invention illustrating rechargeable battery and holder attached;

FIG. 2 is a sectional view taken substantially along the line 2—2 of FIG. 1;

FIG. 3 is partial fragmentary top plan view of the fully assembled cart of FIG. 1;

FIG. 4 is a fragmentary side elevational view of the details of the riser assembly of the cart of FIG. 1;

FIG. 5 is a sectional view of the riser assembly taken substantially along the line 5—5 of FIG. 4;

FIG. 6 is an enlarged fragmentary side elevational view of the assembly of the steering pully, associated upper frame clamps and lower clamp and handle attachment of FIG. 1;

FIG. 7 is a sectional rear elevational view of the assembly of FIG. 6 taken substantially along the line 7—7 of FIG. 6;

DESCRIPTION OF THE PREFERRED EMBODIMENT

Figure 8:
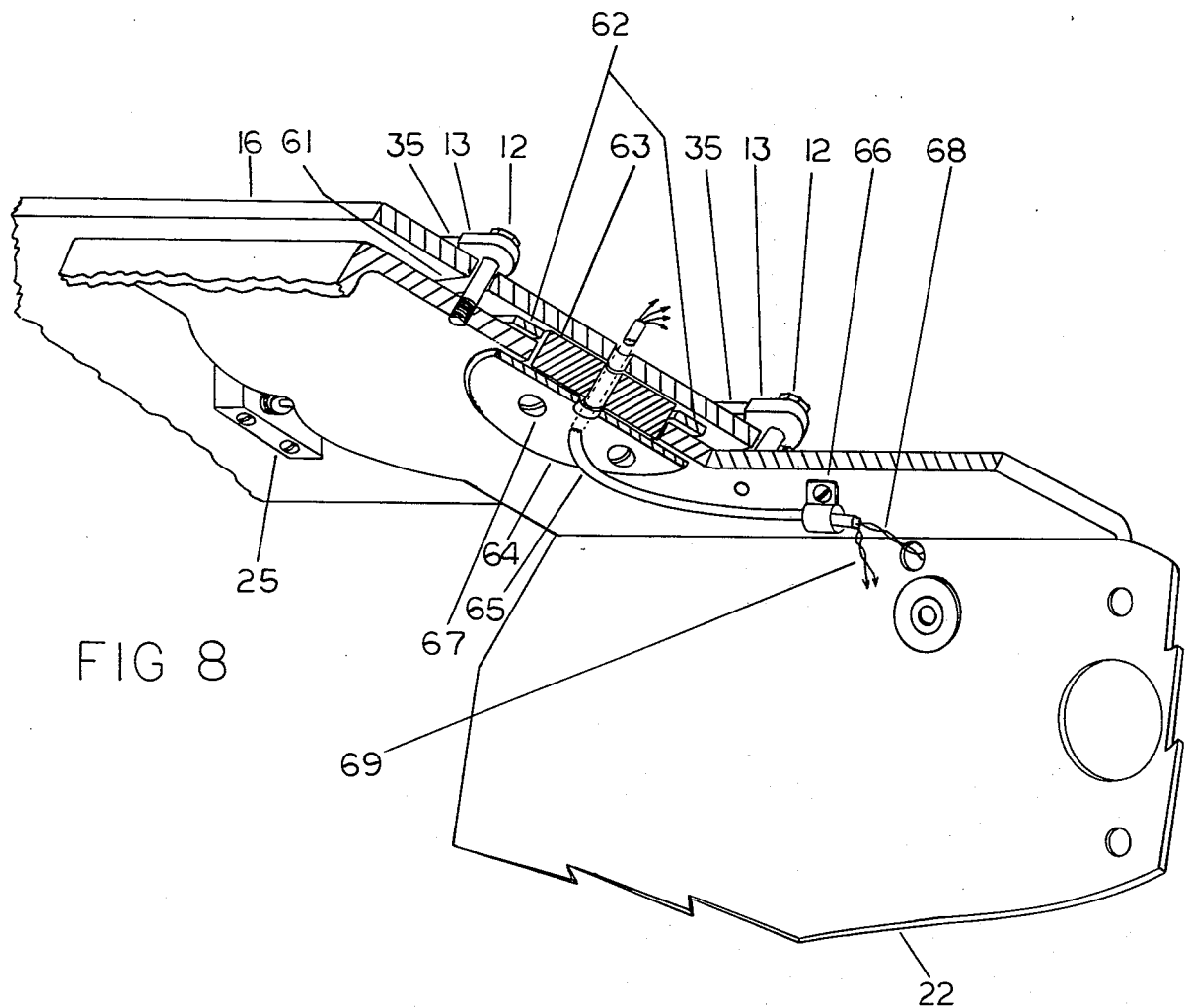
FIG. 8 is a pictorial fragmentary view depicting the manner in which the powered wheel fork is attached to the drive unit main plate.

Referring now to the drawings and, more particularly, to FIGS. 1 and 2, the principal components of a representative form of hand-manipulated golf bag cart are shown as comprising a cart undercarriage 34, a main frame 3, an upper bag holding clamp 1, a lower clamp and handle attachment 39, and a cart handle assembly 41. In the conventional assembly, the cart undercarriage 34 would be directly clamped to the main frame 3 by means of frame riser clamps 5, without the use of an intervening dummy frame section 33 and a frame riser assembly 32. Similarly, with the conventional assembly the lower clamp and handle attachment 39 would be clamped directly to the main frame 3 using the upper bag holding clamp 1 to provide a secure hold. So assembled, the conventional two wheeled cart is either pulled behind the player or is hand pushed, via a cart handle assembly 41. It will be seen that, according to the present invention, most of this conventional structure is retained without any or with, but slight modifications to accomplish motorization thereof.

To this end, a powered wheel 23 together with drive motor 54 and its associated mechanism are contained within, and attached to, the drive unit fork 22. The drive unit fork 22 is enclosed within a drive wheel fender 17 serving to protect the mechanism. The drive unit fork 22 is attached to the drive unit main plate 16 via the drive unit fork swivel 18. The fork swivel is also shown in more detail in FIG. 8 and will be further described below.

The arrangement of the drive components within the fork 22 are shown in FIG. 2. A drive motor 54 is mounted within the drive unit fork 22 as shown and is coupled to a two-pass chain gear down to the drive unit wheel 23. Referring to both FIGS. 1 and 2 the motor drive chain 20 couples the motor drive sprocket 19 to the first reduction sprocket 21 which is shown as shaft-connected to the second reduction sprocket 51; the shaft of which being mounted in suitable low friction bearings on either end. The wheel drive chain 50 couples the second reduction sprocket 51 to the main sprocket 47 which is firmly attached to drive unit wheel hub 56. The drive unit wheel 23 is free to run on its axle 55 affixed to the drive unit fork 22 by a drive axle retaining screw 24 at either end of the axle 55.

The assembly of the drive unit main plate 16 and drive unit attachment frame 6 are attached directly to the cart main frame 3. The cart main frame 3 cradles in the drive unit attachment frame 6 and is secured by means of the rear drive frame clamp 7 and associated bolts 8 and the front drive frame clamp 10 and associated bolt 9.

Figure 10:
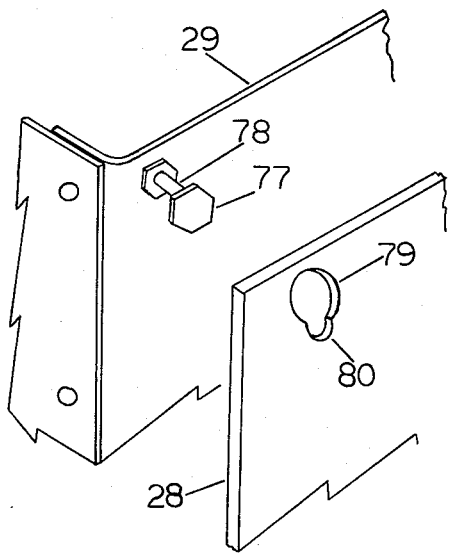
FIG. 10 is a partial pictorial view showing the means for removably attaching the battery holder to the battery holder plate.

The battery holder 29, containing the power source battery 57, is suspended toward the rear from the drive unit attachment frame 6 via the rear battery holder hanger 30 and rear hanger hook bolt 31. The battery holder 29 is suspended toward the front from the front battery holder hook bolt 27 mounted on the battery holder 29 and as shown in FIG. 10, protrudes through and rests in hook shaft hole 80. A battery power cable 58 (FIG. 3) feeds power to the drive electronics via the chassis power on-off switch 52 and a plug and socket combination 53. The plug and socket permits easy electrical disconnection of the battery 57 for recharging purposes. The battery holder plate 28 is supported by the battery holder plate bracket 26. FIG. 10 illustrates the manner of attachment of the front of battery holder 29 as by insertion of the front battery holder hook bolt head 77 through the larger hook insertion hole 79 and then lowering the battery holder 29 so that the battery holder hook shaft 78 rests on the bottom of the smaller hook shaft hole 80. Suspension of the rear of the battery holder 29 is similar to that for the front suspension.

An electronics control module 15 and an electronics power drive module 60 (FIG. 3) are mounted on the front portion of the drive unit main plate 16 and functions with the electrical signal generated by a speed sensor 49 to automatically regulate the average power or apply electrical dynamic braking to the drive motor 54 as required to maintain a constant speed over irregular terrain as will be described in more detail hereinbelow. The electronics control module 15 and power drive module are protected by a module cover 14.

The collapsible cart undercarriage 34 has been placed more rearward toward the operator and more distant from the main frame 3 (in contrast to that of the conventional cart construction) by means of the frame riser assembly 32. To permit use of a conventional clamping of the frame riser assembly 32 to the cart undercarriage 34, a dummy frame section 33 is placed between the lower end of the frame riser assembly 32 and the cart undercarriage 34. The main frame cradles in the upper end of the frame riser assembly 32 and is held in place by the frame riser clamps 5 and associated frame riser clamp bolts 4. This is shown to a larger scale in FIGS. 4 and 5 wherein the frame riser assembly 32 is depicted as consisting of a sandwich construction including a riser body 73, which is preferably of a light material such as wood, and riser outer plates 72 held together by riser assembly bolts 81. Referring again to FIGS. 1 and 3, the lower clamp and handle attachment 39, which would be clamped to the main frame 3 of a conventional cart, is now bolted to a driving turning pulley 38. The assembly of the driving turning pulley 38, the lower clamp and handle attachment 39 and the cart handle assembly 41, constitute a tiller-like steering handle for the cart. This steering assembly is shown in more detail on a larger scale in FIG. 6 and FIG. 7.

Referring to both FIG. 6 and FIG. 7, the upper clamp and bag holder 1 and the upper turn plate and clamp 2 are clamped to the main frame 3 with turn plate and clamp bolts 74. In the steering mechanism consisting of elements 38, 39 and 41, the lower clamp and handle attachment is affixed to the steering pulley by pulley bolts 76. The steering pulley 38, and parts assembled thereto, are rotatably affixed to the upper turn plate and clamp 2 by the turn plate and pulley bolt 71. The steering cable 35 is partially wrapped around the steering pulley 38 and prevented from slipping thereon by the cable retainer clamp 46.

Referring now again to FIGS. 1 and 2 the two runs of steering cable 35 from either side of the steering pulley 38, and including in each run a cable tightening turnbuckle 36, extend downward and forward to pass under the pulleys of the control cable pulley assemblies 11 and end on either side at, and are affixed to, two steering pin clevises 13. A steering pin 12 passes through the steering pin clevises 13, through steering pin slot 61 in the drive unit main plate 16, and is firmly screwed into the drive unit fork 22. Consistent with this arrangement, movement of the cart handle assembly 41 will cause a differential pulling effect in the two steering cable 35 runs to turn the drive unit fork 22 against the forces of fork centering spring detent 25.

The fork attachment construction is shown in greater detail in the cutaway pictorial sketch of FIG. 8. The fork swivel pin 63 inserts in a circular hole in the drive unit fork 22, with a small clearance to permit smooth turning of the fork swivel pin 63 between the drive unit fork 22 and the drive unit main plate 16. The drive unit fork 22 is retained on the fork swivel pin 63 by the fork swivel retaining plate 64, which, in turn, is held in place by retaining plate screws 67 passing through the swivel retaining plate 64 and the fork swivel pin 63 and firmly screwed into the drive unit main plate 16.

Referring again to FIG. 1, a mode switch 43 and a manual speed adjusting potentiometer 44 are mounted on a manual control chassis 45 which is attached to the cart handle assembly 41 near the hand grip end. Electrical connection of these controls are carried via an electrical control cable 42 passing through the hollow cart handle assembly 41 and exiting there from at the electrical control cable connector 40. The latter connector is provided to permit electrical disconnecting of the cart handle assembly 41 from the remainder of the cart where the cart handle 41 may be mechanically disconnected by removal of the handle adjustment screw 70. The electrical control cable 42 continues on through the hollow main frame 3 and terminates in the electronics control module 15. The mode switch 43 may be a three-position switch including an off position which switches in appropriate electrical signals in each position to provide the control command signals. When mode switch 43 is place in the cruise position, the control electronics 15 is commanded to move the cart at the cruise speed set on the manual speed control potentiometer 44. When mode switch 42 is placed in the slow position, the control electronics 15 is commanded to move the cart at an internally pressetable fraction of the speed set on the manual speed control potentiometer 44 and allows the player to rapidly slow the cart down to steer safely around close objects and the like and then return quickly to his selected cruise speed.

When mechanical input power is required, speed control of the cart is accomplished by the control electronics 15 by rapidly switching on and off the power drive 60 of FIG. 3, to the drive motor 54 at a constant rate and varying the amount of on-time with respect to the off-time to precisely control the average power to the drive motor 54 and hence control its operating speed.

Figure 9:
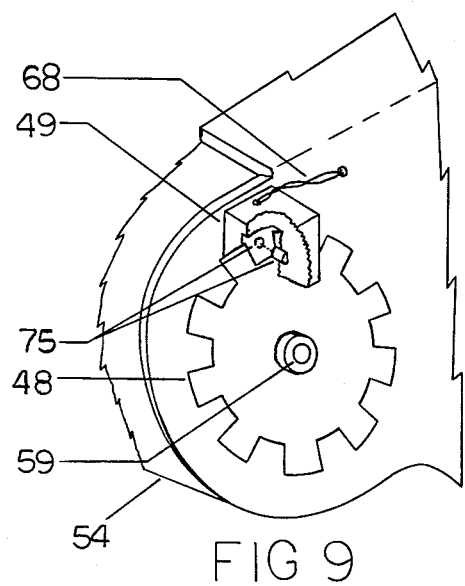
FIG. 9 is a pictorial fragmentary view of a portion of the fork showing a detail of the speed sensor wheel in relation to the drive motor shaft.

Referring to FIGS. 9 and 1 an electrical signal from the speed sensor 49 is sent to the control electronics 15 via the sensor electrical leads 68. The speed sensor generates a continuous stream of electrical impulses by means of the interruption of a light beam transmitted between a light transmitter and light detector of the light transmitter-detector pair 75. This light beam is interrupted by teeth of the pick off wheel 48 passing through the light beam as it rotates on the drive motor shaft 59. The rate of the electrical impulses generated is thus proportional to the speed of the drive motor 54 and hence the cart. The electrical impulse stream is fed to an appropriate circuit in the control electronics module 15 to develop a voltage proportional to the rate of occurrence of the electrical impulses, as is well known. This voltage is compared to the voltage from the manual speed adjust potentiometer 44 and either polarity of a bipolar difference signal obtained; the polarity of which depending on whether mechanical input power or braking is required to maintain constant cart speed. If the polarity voltage is generated indicating that mechanical input power is required, the time on to time off ratio of the power drive current to the drive motor 54 is appropriately varied by the control electronics to increase or decrease the mechanical input power as requires to maintain a constant cart speed. If the polarity voltage is generated indicating that cart braking is required, as may occur when the cart is operated on downhill terrain, the circuitry automatically connects a resistive load across the terminals of the drive motor 54, the latter acting as a generator when driven by gravity coasting, to effect electrical dynamic braking. Either of two methods of dynamic braking may be used, step proportional or true proportional. In step proportional braking, the cart when gravity propelled, is allowed to exceed the commanded speed for a short timed interval following which a braking resistive load is connected across the drive motor 54 terminals that is of a sufficiently low ohmic value to slow the cart to less than a nominally commanded speed setting for the most-inclined-terrain service expected. When the cart slows to the commanded speed, the braking load is automatically disconnected and, after elapse of another short timed interval, is again reconnected. This cycle repeats so long as braking is required to provide step proportional downhill braking. For true proportional braking, a resistive braking load proportional to the amount of over speed is applied electronically for continuous proportional braking.

Referring to FIG. 8, the electrical leads to the drive motor 54 and the speed sensor 49 are clamped to the drive unit fork 22 by the control cable clamp 66 and fed coaxially through an aperture in the center of the fork swivel pin 63 and fork swivel retaining plate 64 and through the drive unit main plate 16, terminating in either the electronics control module 15 or the power drive module 60. This feed hole, being coaxial with the drive unit fork 22 turning axis, results in minimum disturbance of the electrical control cable, in that only a small twisting effect to the cable results from a turning of the fork.

In the drawings and description, there has been presented a typical embodiment of the invention, and although specific terms are used in many cases, they are used in a generic and descriptive sense only and not for purposes of limitation. In particular, a chain geared drive to the added drive wheel has been illustrated and described while other drives such as belt, direct gear and the like could be substituted. A pulley and cable control of the drive unit fork has been illustrated and described while other control from the cart handle such as direct shaft and gear linkage control are also intended to be included. An electro-optical speed sensor has been illustrated while other sensors such as magnetic are also intended to be included.

I claim:

1. In a portable golf bag cart having an elongated main frame with upper and lower ends; a foldable undercarriage removably attached to the frame intermediate the ends thereof and a handle attached to the upper end of the frame; and a pair of free turning spaced wheels supported by the undercarriage; the improvement comprising:

a motorized assembly adapted to be removably attached to the lower end of the main frame; a plate adapted to be attached to the frame; a fork pivotally mounted to said plate; a wheel supported by said fork for pivotal movement about a substantially vertical axis; motor means supported by said assembly for driving said wheel; means adapted to mount said handle to the frame for permitting pivotal movement thereof about an axis substantially perpendicular to that of the frame; steering means for imparting pivotal movement to said wheel in response to pivotal movement of said handle about said axis; and steering means including a cable mounted about and affixed to a pulley with the ends of said cable being attached to said fork for imparting pivotal movement thereto; an adjustable spacer-riser assembly adapted to attach the undercarriage to the frame for elevating the frame by an amount substantially equal to the vertical extent of said motorized assembly and for moving said undercarriage closer to the upper end of said main frame; manually settable means on said handle for developing at least one command signal for setting the speed of said motor means; sensing means including a sensor mounted on said fork adjacent said wheel for developing a sensed signal substantially proportional to the rotational speed of said wheel; and control means responsive to said command signal and to said sensed signal for applying power to said motor means to increase the speed thereof when said command signal is higher than said sensed signal and for switching in a resistive load across the terminals of said motor means to reduce the speed thereof when said command signal is lower than said sensed signal whereby the speed of said wheel is maintained substantially constant about a preselected setting.

* * * * *